United States Patent
Zhang et al.

(10) Patent No.: US 10,542,521 B2
(45) Date of Patent: Jan. 21, 2020

(54) SIGNALING SUPPORT FOR MULTI-LAYER MBSFN

(71) Applicant: QUALCOMM Incorporated, San Diego, CA (US)

(72) Inventors: Xiaoxia Zhang, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 379 days.

(21) Appl. No.: 15/199,119

(22) Filed: Jun. 30, 2016

(65) Prior Publication Data

US 2017/0026935 A1   Jan. 26, 2017

Related U.S. Application Data

(60) Provisional application No. 62/194,712, filed on Jul. 20, 2015.

(51) Int. Cl.

| H04W 72/00 | (2009.01) |
| H04W 4/06 | (2009.01) |
| H04W 72/04 | (2009.01) |
| H04L 29/06 | (2006.01) |
| H04L 29/08 | (2006.01) |
| H04W 84/04 | (2009.01) |

(52) U.S. Cl.
CPC .......... *H04W 72/005* (2013.01); *H04W 4/06* (2013.01); *H04W 72/042* (2013.01); *H04L 65/4069* (2013.01); *H04L 67/02* (2013.01); *H04W 84/042* (2013.01)

(58) Field of Classification Search
None
See application file for complete search history.

(56) References Cited

U.S. PATENT DOCUMENTS

| 8,942,156 B2* | 1/2015 | Yang | H04W 72/005 370/312 |
| 9,699,764 B2* | 7/2017 | Wang | H04W 72/005 |
| 10,225,820 B2* | 3/2019 | Zhang | H04W 72/005 |
| 2009/0122740 A1* | 5/2009 | Bouazizi | H04W 72/005 370/312 |

(Continued)

FOREIGN PATENT DOCUMENTS

EP    2262290 A1    12/2010

OTHER PUBLICATIONS

International Search Report and Written Opinion—PCT/US2016/040748—ISA/EPO—dated Sep. 20, 2016.

*Primary Examiner* — Donald L Mills
(74) *Attorney, Agent, or Firm* — Norton Rose Fulbright US LLP

(57) ABSTRACT

Enhancement of multicast-broadcast multimedia services is disclosed by providing multiple layers that may carry additional or enhanced information. The layers may be defined over a single multicast-broadcast single frequency network (MBSFN) area, or, in additional aspects, may be defined having separate MBSFN areas. When the network provides a single MBSFN area for each layer, control information for the layers may be transmitted in a scheduled multicast-broadcast control message, while when the layers are nested with separate MBSFN areas, the control information for each layer may be transmitted in a separate multicast-broadcast control message.

15 Claims, 15 Drawing Sheets

(56) References Cited

U.S. PATENT DOCUMENTS

| | | | |
|---|---|---|---|
| 2011/0007683 A1 | 1/2011 | Kim et al. | |
| 2011/0305183 A1* | 12/2011 | Hsu | H04W 72/005 |
| | | | 370/312 |
| 2013/0044668 A1* | 2/2013 | Purnadi | H04W 36/0055 |
| | | | 370/312 |
| 2013/0336189 A1 | 12/2013 | Mandil et al. | |
| 2014/0059618 A1* | 2/2014 | Wei | H04N 21/6131 |
| | | | 725/62 |
| 2014/0198707 A1* | 7/2014 | Wang | H04W 4/70 |
| | | | 370/312 |
| 2015/0188719 A1* | 7/2015 | Zhao | H04W 72/005 |
| | | | 370/312 |
| 2016/0150590 A1* | 5/2016 | Pocha | H04L 65/4076 |
| | | | 370/329 |
| 2016/0261381 A1* | 9/2016 | Ko | H04L 1/1812 |

* cited by examiner

SIGNALING SUPPORT FOR MULTI-LAYER MBSFN

CROSS-REFERENCE TO RELATED APPLICATIONS

This application claims the benefit of U.S. Provisional Patent Application No. 62/194,712, entitled, "SIGNALING SUPPORT FOR MULTI-LAYER MBSFN," filed on Jul. 20, 2015, which is expressly incorporated by reference herein in its entirety.

BACKGROUND

Field

Aspects of the present disclosure relate generally to wireless communication systems, and more particularly, to signaling support for multi-layer multicast-broadcast single frequency network (MBSFN) transmission mode.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

Recent LTE versions support evolved multimedia broadcast-multicast service (eMBMS) in the LTE air interface to provide the video streaming and file download broadcast delivery. For example, video streaming service is expected to be transported by the DASH (Dynamic Adaptive Streaming using HTTP) protocol over FLUTE (File Delivery over Unidirectional Transport) as defined in IETF RFC 3926 over UDP/IP packets. File download service is transported by FLUTE over UDP/IP protocols. Both high layers over IP are processed by the LTE broadcast channels in PHY and L2 (including MAC and RLC layers). However, such transport includes multiple inefficiencies which are not currently addressed in the communications industry.

SUMMARY

Aspects of the present disclosure are directed to enhancing multicast-broadcast multimedia services by providing multiple layers that may carry additional or enhanced information. The layers may be defined over a single multicast-broadcast single frequency network (MBSFN) area, or, in additional aspects, may be defined having separate MBSFN areas. When the network provides a single MBSFN area for each layer, control information for the layers may be transmitted in a scheduled multicast-broadcast control message, while when the layers are nested with separate MBSFN areas, the control information for each layer may be transmitted in a separate multicast-broadcast control message.

In one aspect of the disclosure, a method of wireless communication includes broadcasting an indication of a MBSFN area and a schedule of multicast-broadcast control transmissions in a multicast-broadcast transmission period, transmitting a multicast-broadcast control message according to the schedule, wherein the multicast-broadcast control message indicates a base layer and an enhancement layer of the MBSFN area and includes base control information for the base layer and enhanced control information for the enhanced layer, transmitting a base layer multicast-broadcast service over a first multicast-broadcast channel, and transmitting an enhancement layer multicast-broadcast service over a second multicast-broadcast channel.

In an additional aspect of the disclosure, a method of wireless communication includes broadcasting a first indication of a first MBSFN area associated with a first multicast-broadcast layer, broadcasting a second indication of a second MBSFN area associated with a second multicast-broadcast layer, broadcasting a schedule of multicast-broadcast control transmissions in a multicast-broadcast transmission period, and transmitting a multicast-broadcast service on at least one of the first multicast-broadcast layer and the second multicast-broadcast layer.

In an additional aspect of the disclosure, a method of wireless communication includes receiving a first indication of a first MBSFN area associated with a first multicast-broadcast layer, receiving a second indication of a second MBSFN area associated with a second multicast-broadcast layer, receiving a schedule of multicast-broadcast control transmissions in a multicast-broadcast transmission period, receiving a plurality of alternative transmission configurations, wherein each of the plurality of alternative transmission configurations is associated with whether the first multicast-broadcast layer is superposition coded with the second multicast-broadcast layer, and receiving a multicast-broadcast service on at least one of the first multicast-broadcast layer and the second multicast-broadcast layer.

In an additional aspect of the disclosure, a method of wireless communication includes receiving an indication of a MBSFN area and a schedule of multicast-broadcast control transmissions in a multicast-broadcast transmission period, receiving a multicast-broadcast control message according to the schedule, wherein the multicast-broadcast control message indicates a base layer and an enhancement layer of the MBSFN area and includes base control information for the base layer and enhanced control information for the enhanced layer, receiving a base layer multicast-broadcast service over a first multicast-broadcast channel, and receiving an enhancement layer multicast-broadcast service over a second multicast-broadcast channel.

In one aspect of the disclosure, an apparatus configured for wireless communication includes means for broadcasting an indication of a MBSFN area and a schedule of multicast-broadcast control transmissions in a multicast-broadcast transmission period, means for transmitting a multicast-broadcast control message according to the schedule, wherein the multicast-broadcast control message indicates a base layer and an enhancement layer of the MBSFN area and includes base control information for the base layer and enhanced control information for the enhanced layer, means for transmitting a base layer multicast-broadcast service over a first multicast-broadcast channel, and means for transmitting an enhancement layer multicast-broadcast service over a second multicast-broadcast channel.

In an additional aspect of the disclosure, an apparatus configured for wireless communication includes means for broadcasting a first indication of a first MBSFN area associated with a first multicast-broadcast layer, means for broadcasting a second indication of a second MBSFN area associated with a second multicast-broadcast layer, means for broadcasting a schedule of multicast-broadcast control transmissions in a multicast-broadcast transmission period, and means for transmitting a multicast-broadcast service on at least one of the first multicast-broadcast layer and the second multicast-broadcast layer.

In an additional aspect of the disclosure, an apparatus configured for wireless communication includes means for receiving a first indication of a first MBSFN area associated with a first multicast-broadcast layer, means for receiving a second indication of a second MBSFN area associated with a second multicast-broadcast layer, means for receiving a schedule of multicast-broadcast control transmissions in a multicast-broadcast transmission period, means for receiving a plurality of alternative transmission configurations, wherein each of the plurality of alternative transmission configurations is associated with whether the first multicast-broadcast layer is superposition coded with the second multicast-broadcast layer, and means for receiving a multicast-broadcast service on at least one of the first multicast-broadcast layer and the second multicast-broadcast layer.

In an additional aspect of the disclosure, an apparatus configured for wireless communication includes means for receiving an indication of a MBSFN area and a schedule of multicast-broadcast control transmissions in a multicast-broadcast transmission period, means for receiving a multicast-broadcast control message according to the schedule, wherein the multicast-broadcast control message indicates a base layer and an enhancement layer of the MBSFN area and includes base control information for the base layer and enhanced control information for the enhanced layer, means for receiving a base layer multicast-broadcast service over a first multicast-broadcast channel, and means for receiving an enhancement layer multicast-broadcast service over a second multicast-broadcast channel.

In an additional aspect of the disclosure, a non-transitory computer-readable medium having program code recorded thereon. The program code further includes code to broadcast an indication of a MBSFN area and a schedule of multicast-broadcast control transmissions in a multicast-broadcast transmission period, code to transmit a multicast-broadcast control message according to the schedule, wherein the multicast-broadcast control message indicates a base layer and an enhancement layer of the MBSFN area and includes base control information for the base layer and enhanced control information for the enhanced layer, code to transmit a base layer multicast-broadcast service over a first multicast-broadcast channel, and code to transmit an enhancement layer multicast-broadcast service over a second multicast-broadcast channel.

In an additional aspect of the disclosure, a non-transitory computer-readable medium having program code recorded thereon. The program code further includes code to broadcast a first indication of a first MBSFN area associated with a first multicast-broadcast layer, code to broadcast a second indication of a second MBSFN area associated with a second multicast-broadcast layer, code to broadcast a schedule of multicast-broadcast control transmissions in a multicast-broadcast transmission period, and code to transmit a multicast-broadcast service on at least one of the first multicast-broadcast layer and the second multicast-broadcast layer.

In an additional aspect of the disclosure, a non-transitory computer-readable medium having program code recorded thereon. The program code further includes code to receive a first indication of a first MBSFN area associated with a first multicast-broadcast layer, code to receive a second indication of a second MBSFN area associated with a second multicast-broadcast layer, code to receive a schedule of multicast-broadcast control transmissions in a multicast-broadcast transmission period, code to receive a plurality of alternative transmission configurations, wherein each of the plurality of alternative transmission configurations is associated with whether the first multicast-broadcast layer is superposition coded with the second multicast-broadcast layer, and code to receive a multicast-broadcast service on at least one of the first multicast-broadcast layer and the second multicast-broadcast layer.

In an additional aspect of the disclosure, a non-transitory computer-readable medium having program code recorded thereon. The program code further includes code to receive an indication of a MBSFN area and a schedule of multicast-broadcast control transmissions in a multicast-broadcast transmission period, code to receive a multicast-broadcast control message according to the schedule, wherein the multicast-broadcast control message indicates a base layer and an enhancement layer of the MBSFN area and includes base control information for the base layer and enhanced control information for the enhanced layer, code to receive a base layer multicast-broadcast service over a first multicast-broadcast channel, and code to receive an enhancement layer multicast-broadcast service over a second multicast-broadcast channel.

In an additional aspect of the disclosure, an apparatus configured for wireless communication is disclosed. The apparatus includes at least one processor, and a memory coupled to the processor. The processor is configured to broadcast an indication of a MBSFN area and a schedule of multicast-broadcast control transmissions in a multicast-broadcast transmission period, to transmit a multicast-broadcast control message according to the schedule, wherein the multicast-broadcast control message indicates a base layer and an enhancement layer of the MBSFN area and includes base control information for the base layer and enhanced control information for the enhanced layer, to transmit a base layer multicast-broadcast service over a first multicast-broadcast channel, and to transmit an enhancement layer multicast-broadcast service over a second multicast-broadcast channel.

In an additional aspect of the disclosure, an apparatus configured for wireless communication is disclosed. The apparatus includes at least one processor, and a memory coupled to the processor. The processor is configured to broadcast a first indication of a first MBSFN area associated with a first multicast-broadcast layer, to broadcast a second indication of a second MBSFN area associated with a second multicast-broadcast layer, to broadcast a schedule of multicast-broadcast control transmissions in a multicast-broadcast transmission period, and to transmit a multicast-broadcast service on at least one of the first multicast-broadcast layer and the second multicast-broadcast layer.

In an additional aspect of the disclosure, an apparatus configured for wireless communication is disclosed. The apparatus includes at least one processor, and a memory coupled to the processor. The processor is configured to receive a first indication of a first MBSFN area associated with a first multicast-broadcast layer, to receive a second indication of a second MBSFN area associated with a second multicast-broadcast layer, to receive a schedule of multicast-broadcast control transmissions in a multicast-broadcast transmission period, to receive a plurality of alternative transmission configurations, wherein each of the plurality of alternative transmission configurations is associated with whether the first multicast-broadcast layer is superposition coded with the second multicast-broadcast layer, and to receive a multicast-broadcast service on at least one of the first multicast-broadcast layer and the second multicast-broadcast layer.

In an additional aspect of the disclosure, an apparatus configured for wireless communication is disclosed. The apparatus includes at least one processor, and a memory coupled to the processor. The processor is configured to receive an indication of a MBSFN area and a schedule of multicast-broadcast control transmissions in a multicast-broadcast transmission period, to receive a multicast-broadcast control message according to the schedule, wherein the multicast-broadcast control message indicates a base layer and an enhancement layer of the MBSFN area and includes base control information for the base layer and enhanced control information for the enhanced layer, to receive a base layer multicast-broadcast service over a first multicast-broadcast channel, and to receive an enhancement layer multicast-broadcast service over a second multicast-broadcast channel.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
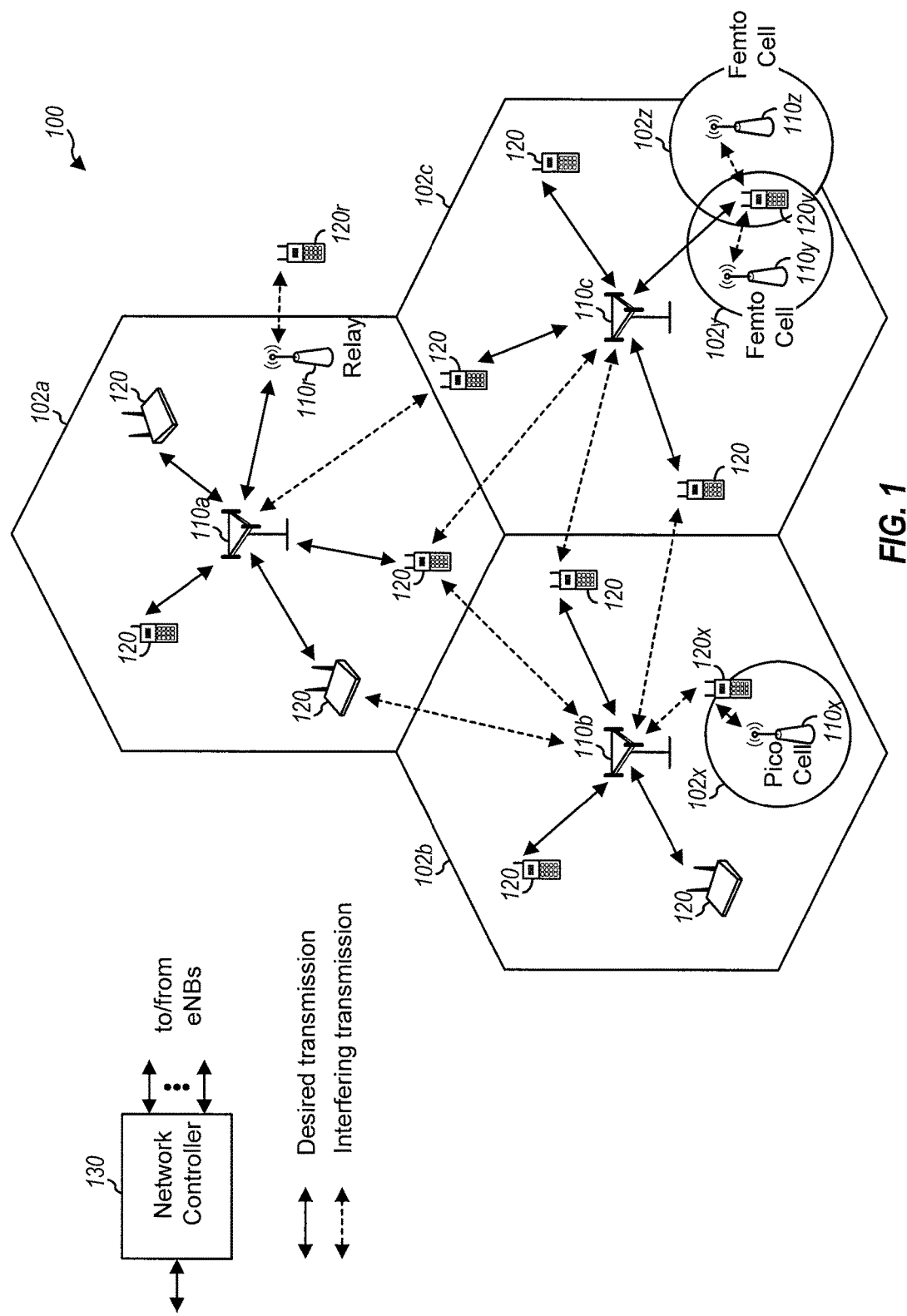
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a tablet, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
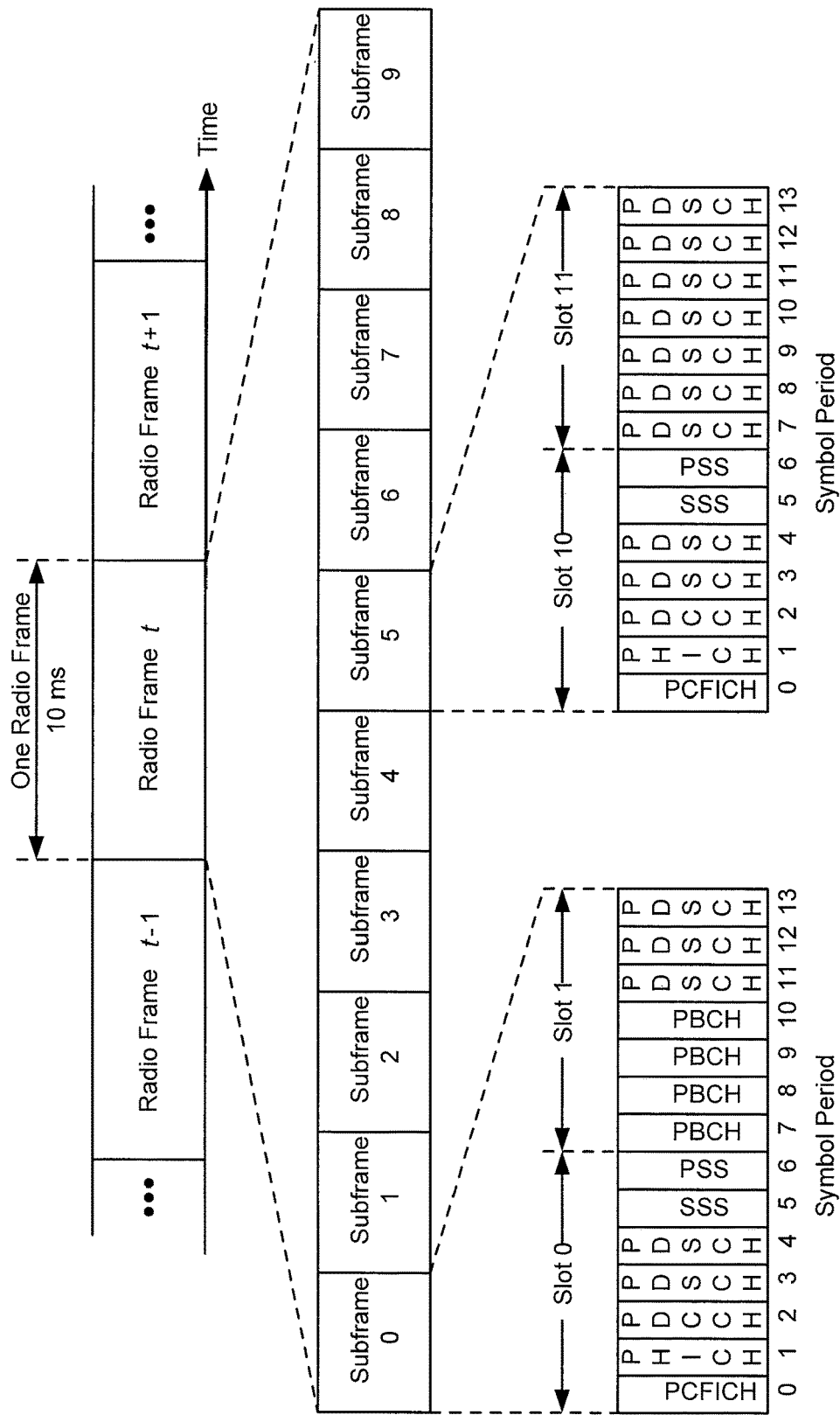
FIG. 2 is a block diagram conceptually illustrating an example of a down link frame structure in a telecommunications system.
Figure 6:
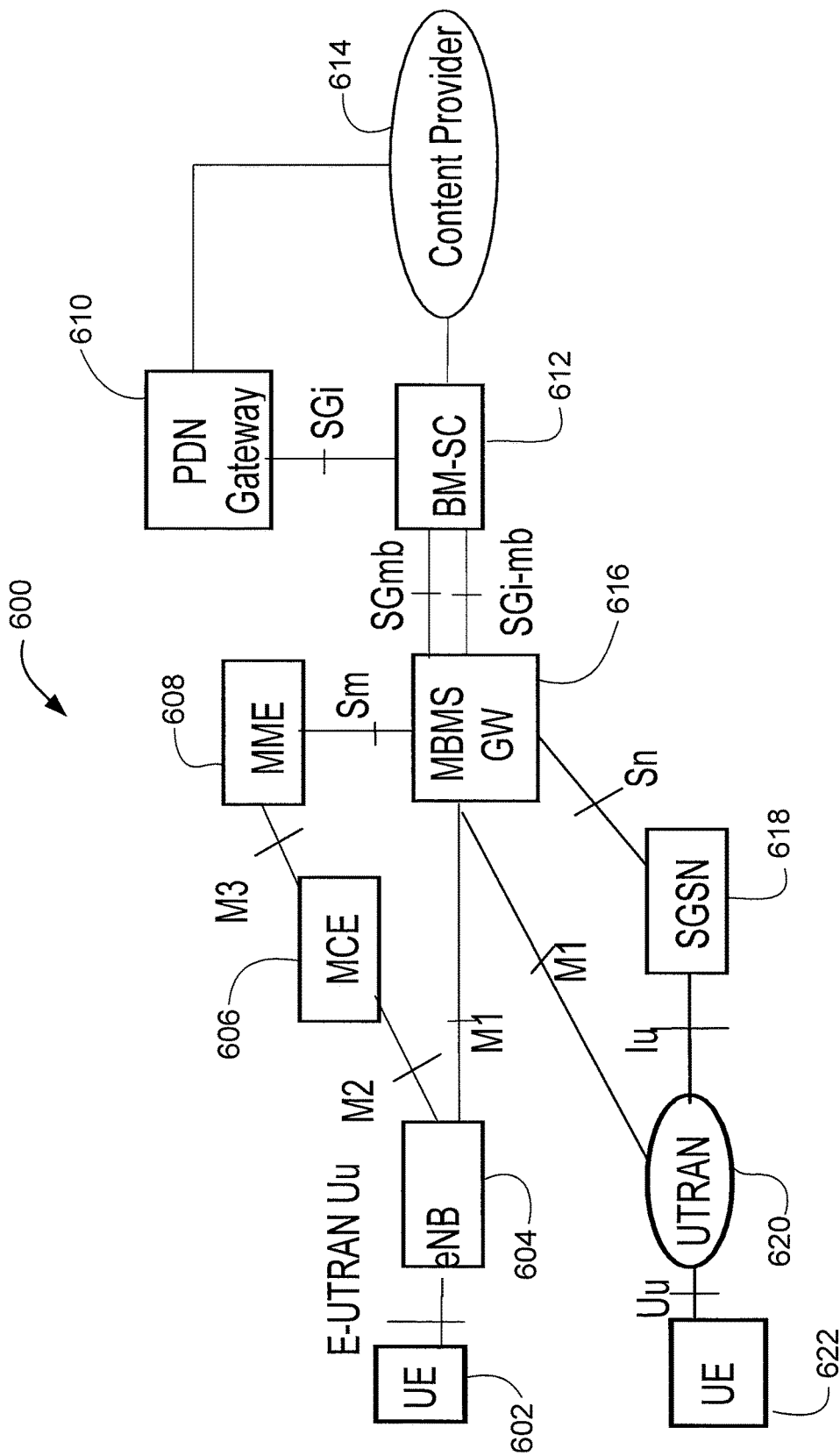
FIG. 6 is a block diagram illustrating components of a wireless communication system for providing or supporting MBSFN service.

FIG. 2 shows a down link frame structure common in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
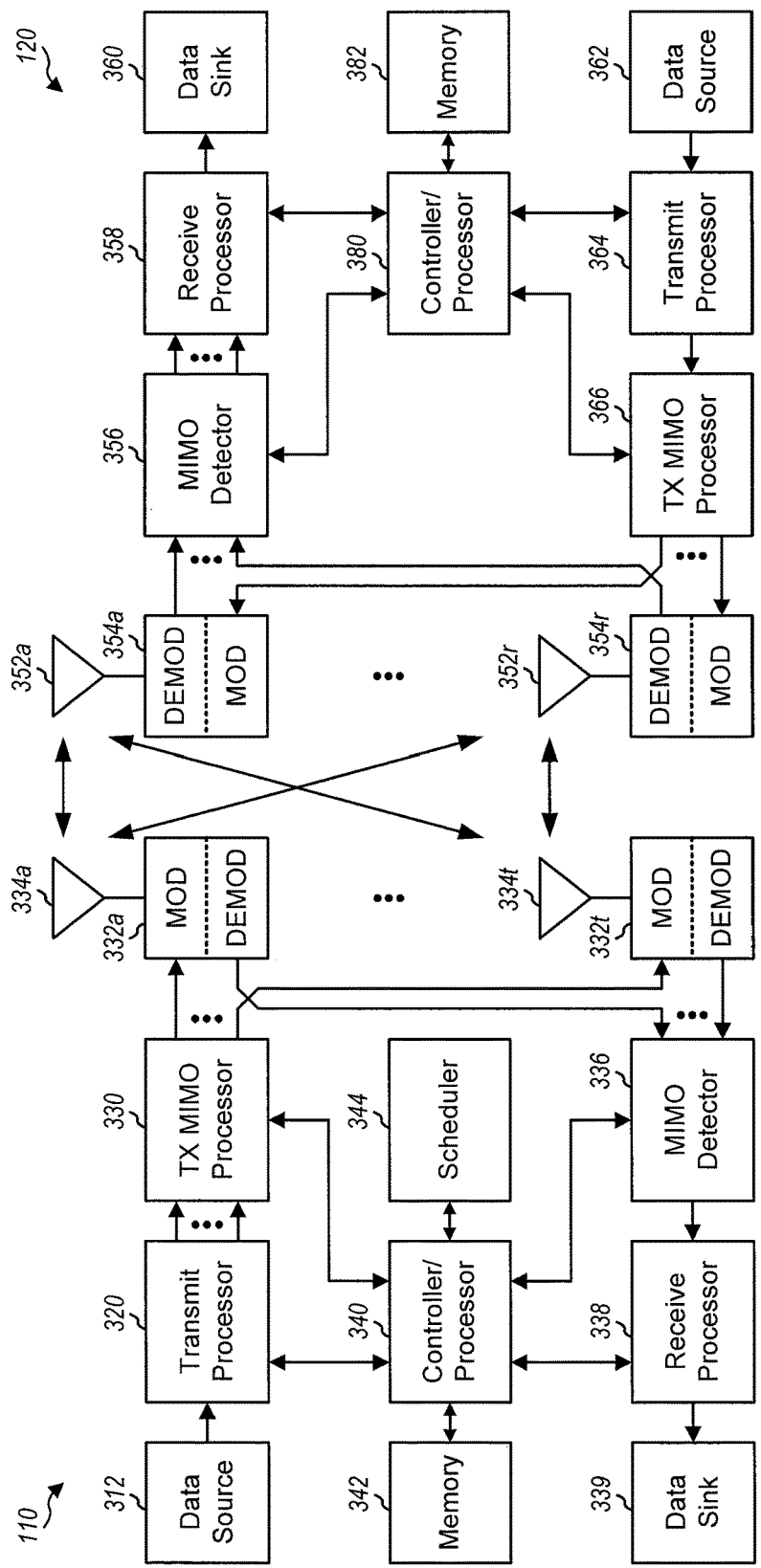
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS and Unicast Signaling in Single Frequency Networks:

One technique to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB(s) within radio range as part of the eMBMS service area or MBSFN area. To decode the eMBMS signal, each UE receives Multicast Control Channel (MCCH) information from the eMBMS area. However, to acquire MCCH information, each UE receives system information block 13 (SIB-13) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served the SIB-13 message and PDCCH signals by one of the eNBs in the area, and the MCCH by each of the eNBs participating in the eMBMS transmission in the MBSFN area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes per frame allocated for eMBMS.

Figure 4:
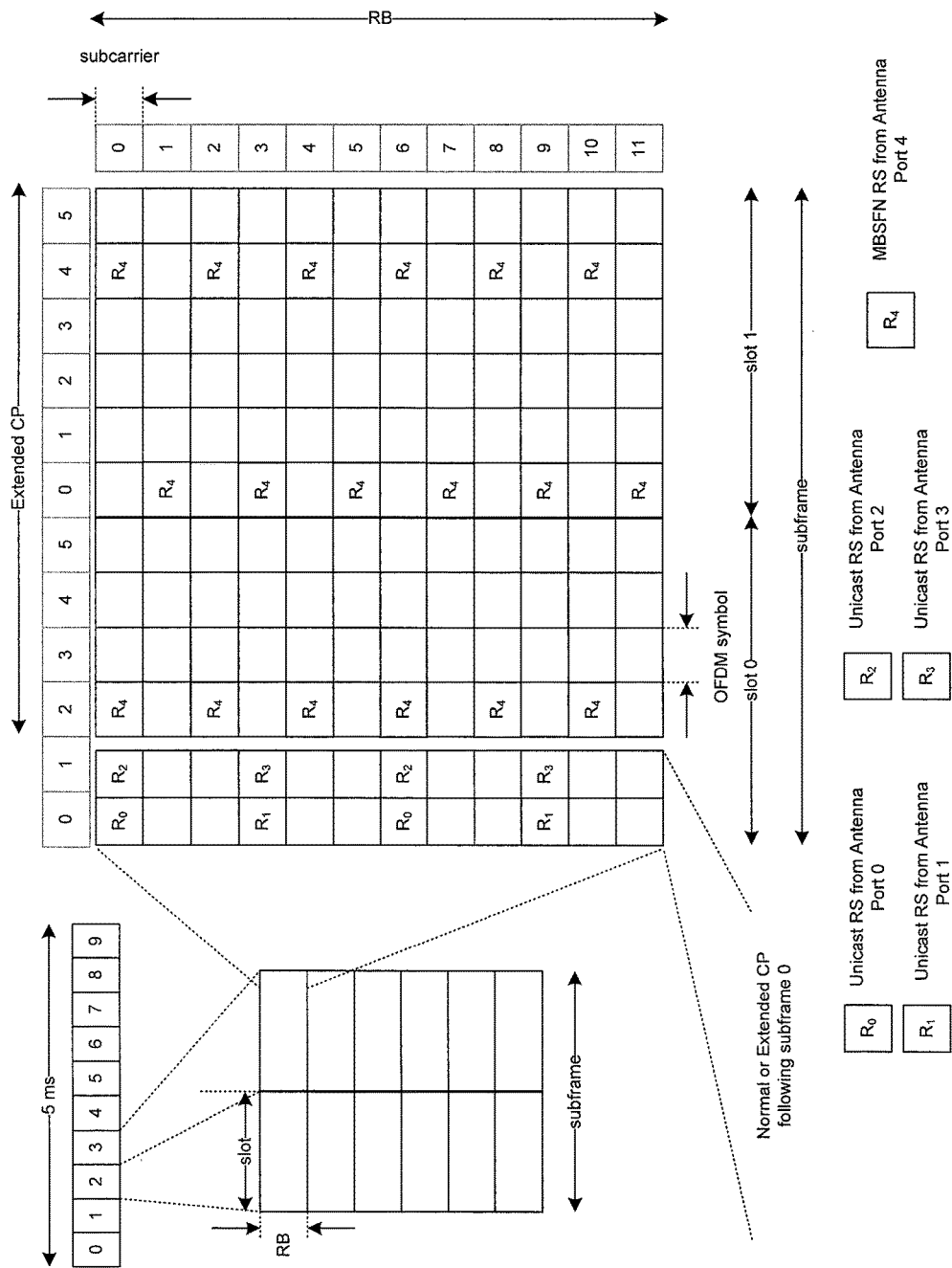
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 5:
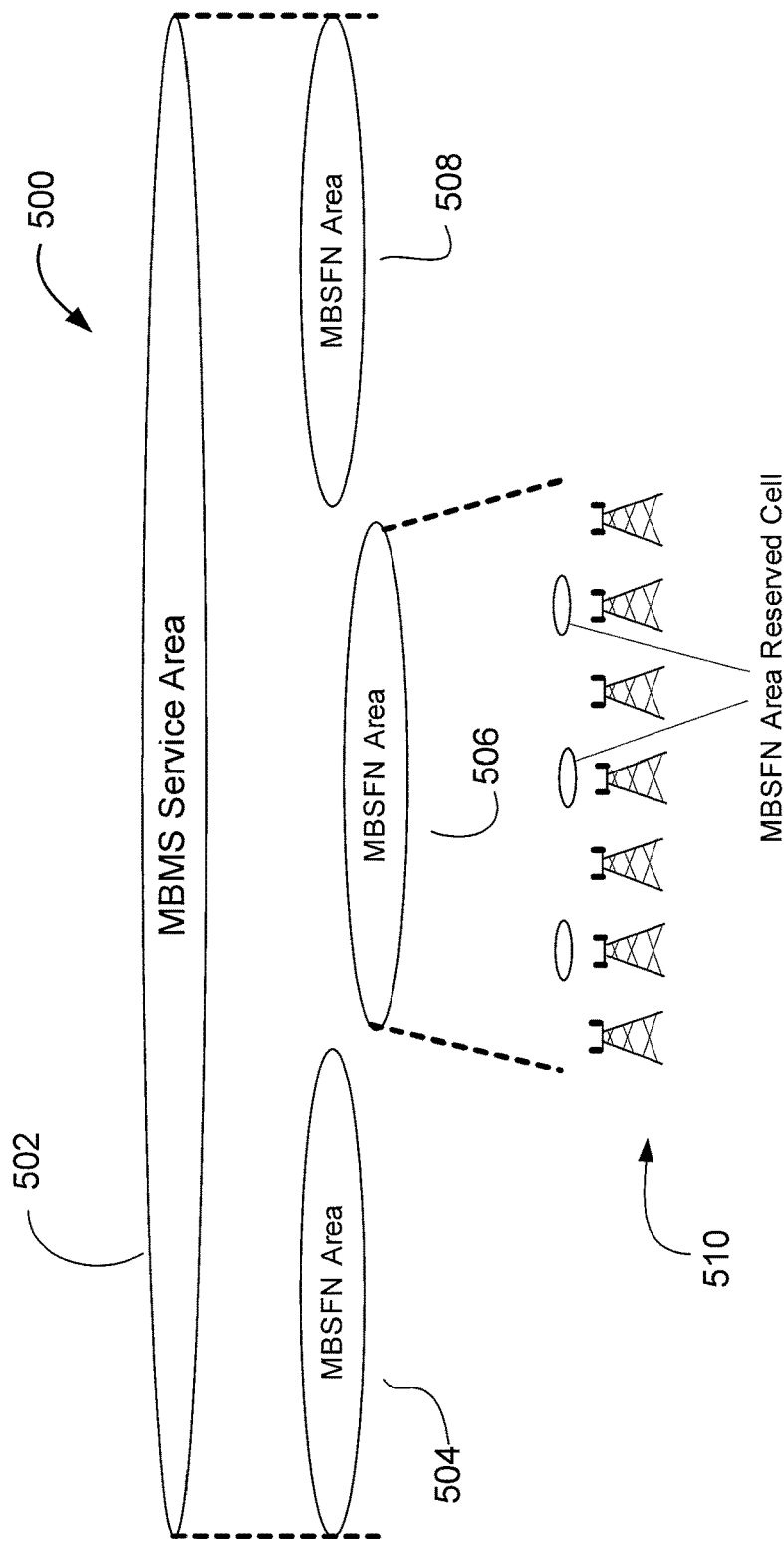
FIG. 5 is a diagram illustrating MBMS over a Single Frequency Network (MBSFN) areas within an MBSFN service area.

With continued reference to FIG. 4, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS Service Areas:

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS System Components And Functions:

FIG. 6 illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gateway (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a user equipment (UE)/mobile entity 602 via an E-UTRAN Uu interface, which is the interface that allows data transfer between the eNB and UEs. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SG-mb (user plane) reference point, and provide an interface for entities using MBMS bearers through the SGi-mb (control plane) reference point. The SG-mb interface is the interface between the MBMS-GW and the BM-SC and carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces. The Sn interfaces are the interfaces of the evolved packet system (EPS), while the Iu interface is the interface between the core network and the UTRAN.

The system 600 may further include a Multicast Coordinating Entity (MCE) 606. The MCE 606 may perform an admission control function form MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 612 may handle intake of multicast content from one or more sources such as the content provider server 614, and provide other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast. A separate Packet Data Protocol (PDP) context may be used to carry control messages between the UE and the BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, session update and session stop to the MBMS-GW 616 including session attributes such as QoS and MBMS service area.

The system 600 may further include a Multicast Management Entity (MME) 608 in communication with the MCE 606 and MBMS-GW 608. The MME 608 may provide a control plane function for MBMS over E-UTRAN. In addition, the MME may provide the eNB 604, 620 with multicast related information defined by the MBMS-GW 616. An Sm interface, which is the interface between the MME 608 and the MBMS-GW 616, may be used to carry MBMS control signaling, for example, session start and session stop signals.

The system 600 may further include a Packet Data Network (PDN) Gateway (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

In eMBMS systems, a MBMS service is scheduled for downlink transmission over the transmission period on a corresponding MBMS traffic channel (MTCH). Each MTCH each may carry one broadcast content (e.g., a TV channel, service channel, streaming data service, etc.). Over a given transmission duration, multiple MCH scheduling periods (MSP) may be scheduled during which the service will broadcast the streaming video data using the MTCH to transmit the data packets of the service. A multicast channel (MCH) scheduling information (MSI) may be provided by the base station at the beginning of the MSP to indicate which subframes are used by each of the MTCH during the MSP. The MTCH may be multiplexed on the physical channel for transmission, which results in the MTCH being transmitted in multiplexed segments during the MSPs. Thus, the MTCH may not be transmitted continuously on the transmission resource. Each segment of MTCH with the MSPs may include transmission of multiple data symbols.

Additional broadcasting services may be added for user access by creating an additional network layer for multicast-broadcast services. In one aspect of such multilayer system, multiple MBSFN layers may be deployed using superposition coding for LTE systems. With superposition coding, transmissions for each layer may be superimposed over the same time slots in which, on the receiving side, successive decoding may be used to cancel the unwanted overlapping signals before decoding the intended signal. Thus, at the cost of small coverage loss of the base layer MBSFN, an enhancement layer MBSFN can be added to provide additional broadcasting service to a smaller service region.

In order to make use of the superposition coding with the successive decoding, more advanced UEs may be used. Thus, such more advanced UEs may receive services over the enhancement layer MBSFN. The systems and networks that implement such multiple layered multicast-broadcast services may be designed with backward compatible features or simply make the system non-backward compatible. Backward compatible designs may be configured, such that legacy UEs may access the base layer MBSFN. non-backward compatible designs provide accessibility to both the base layer and enhancement layer to only to the advanced, non-legacy UEs. Legacy UEs would then be served by non-layered, non-superposition coded MBSFN areas.

In legacy MBMS systems, system information block (SIB)-13 typically provides MBSFN system information, such as the location of the MCCH and signaling the modulation and coding scheme (MCS). One MCCH per MBSFN area provides the control information for that area and generally includes the MBSFN area configuration message with configuration data for the MBSFN area, such as subframe list, data MCS, and the like. This configuration data does not change very often for a given MBSFN area. As indicated above, the MSI control element indicates the location of each MTCH and the unused subframe. It may be included in the first subframe of the MSP. If a subframe is not used for MTCH, it can be used for unicast. Thus, the MSI may change faster than the MCCH.

Two physical layer designs have been proposed for implementing the multiple layer multicast-broadcast services, such as the layered MBSFN. In a first design, a backward compatible physical layer structure provides for enhancement layer MBSFN reference signals (RS) to puncture base layer MBSFN data, while the enhancement layer MBSFN data is rate matched around the base layer MBSFN RS. In such networks according to this first backward compatible structure, legacy MBSFN UEs may use the base layer and treat the overlaying enhancement layer MBSFN signal as additional noise.

In a second design, a non-backward compatible physical layer structure is provided in which both the base and enhancement layer MBSFN may be used and accessed by non-legacy UEs. In this non-backward compatible physical layer structure, for non-shared RS, the base layer MBSFN data is rate matched around the enhancement layer MBSFN RS, while the enhancement layer MBSFN data is rate matched around the base layer MBSFN RS. For shared RS, where both the base layer and the enhancement layer use the same RS, the traffic to pilot ratio (TPR) for the base layer MBSFN may be signaled for proper demodulation. Legacy UEs may be served in legacy MBSFN areas without superposition coding and are time division multiplexed with both the base and enhancement layer MBSFN UEs.

Figure 7A:
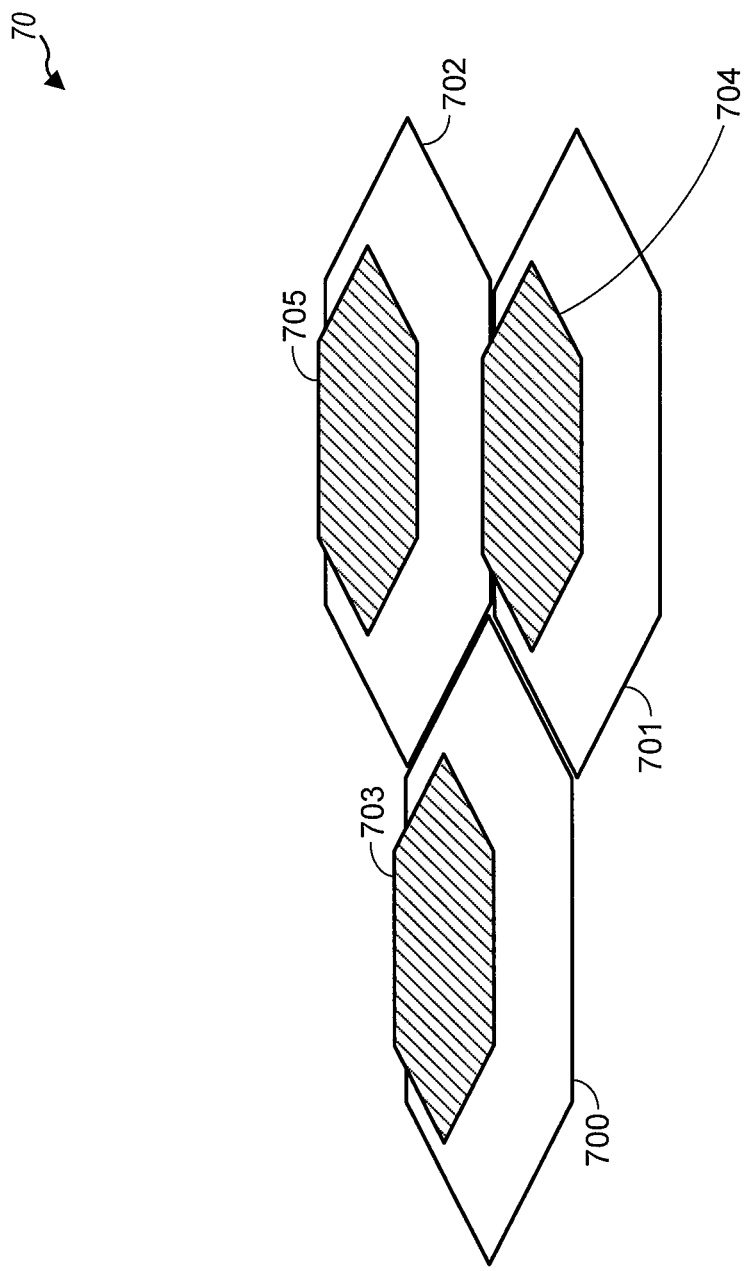
FIG. 7A is a block diagram illustrating an eMBMS system having MBSFN areas and enhancement layers.

FIG. 7A is a block diagram illustrating an eMBMS system 70 having MBSFN areas 700-702 and enhancement layers 703-705. EMBMS system 70 includes MBSFN areas 700-702. Enhancement layers 703-705 are superposition coded over MBSFN areas 700-702 and operate as enhanced areas of coverage or resolution for compatible UEs with their coverage area. EMBMS system 70 is illustrated in a perspective view to show that the base layer of MBSFN areas 700-702 also exists with enhancement layers 703-705 superimposed within it. In one example implementation of eMBMS system 70, enhancement layers 703-705 provide enhanced channel resolution for compatible UEs at the cell centers of MBSFN areas 700-702, respectively, and may be defined to share the same MCCH for control information. Thus, within the MBSFN area enhancements of eMBMS system 70, the base layers of MBSFN areas 700-702 and enhancement layers 703-705 may be considered two parts of the same MBSFN area. Compatible UEs located with the coverage areas of enhancement layers 703-705 may then access the enhanced content/resolution broadcast in enhancement layers 703-705.

Figure 7B:
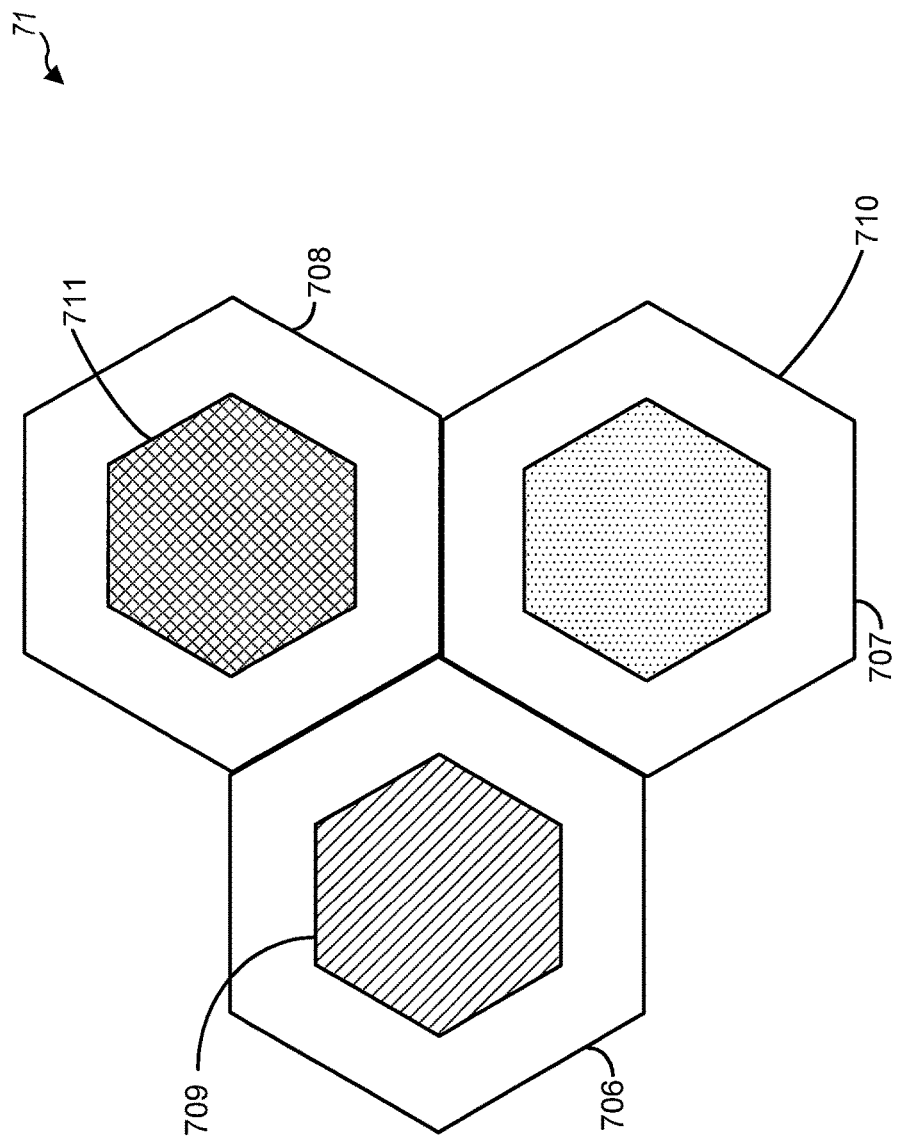
FIG. 7B is a block diagram illustrating an eMBMS system having MBSFN areas with nested enhancement layers.

FIG. 7B is a block diagram illustrating an eMBMS system 71 having MBSFN areas 706-708 with nested enhancement layers 709-711. While each of enhancement layers 709-711 are superposition coded over the base layers of MBSFN areas 706-708, enhancement layers 709-711 define different MBSFN areas nested within MBSFN areas 706-708 and offering different content than the base layers of MBSFN areas 706-708. Thus, enhancement layers 709-711 would be listed in MBSFN information, such as in SIB-13, as having their own MCCH. In one example implementation of eMBMS system 71, enhancement layer 709 may be specifically targeted for a location, such as a venue, that is a different location or venue from either or both of enhancement layers 710 and 711. Thus, for example, enhancement layer 709 may be located within a stadium and broadcasts or simulcasts a sports event being held at the stadium. Compatible UEs located within the stadium would have access to the broadcast content over the MBMS service transmitted in enhancement layer 709.

Because the enhancement layer of such nested MBSFN area eMBMS networks may have its own MCCH and MSI, compatible UEs will operate to read the MCCH/MSI of both the base layer and enhancement layer. With both FIGS. 7A and 7B, even if the compatible UE is only using one of the two layers, the UE would still want to know the activity of the other layer. For example, the data MCS and TPR for demodulation will depend, at least in part, on the activity of the other layer. For example, in a given subframe, if the base layer is not present, all the energy can be used for enhancement layer transmission, in which the TPR may be higher and a larger MCS may be selected. Conversely, if the base layer is present, less energy will be available for use in the enhancement layer transmission. Thus, the enhanced layer MCS that can be supported may be a function of the base layer MCS. Moreover, the location of the enhancement layer RS may also depends on whether the base layer is present. If the base layer is not present, the enhancement layer may simply use the base layer RS structure. The compatible UEs may further perform blind detection to determine the activity of base layer in addition to acquiring the information by reading MCCH/MSI of both base and enhancement layer.

On the base station side, because some parameters may be conditional on whether either or both of the base layer or enhancement layer are present, the base station may include the conditional MCS/TPR information in the MCCH. For example, the base station may signal MCS/TPR values for when the other layer is present or not, and, if present, which MCS will be used. This operation may be applicable for use with the enhancement layer in backward compatible designs, and may also be applicable for use with the base layer in a non-backward compatible designs.

Figure 8:
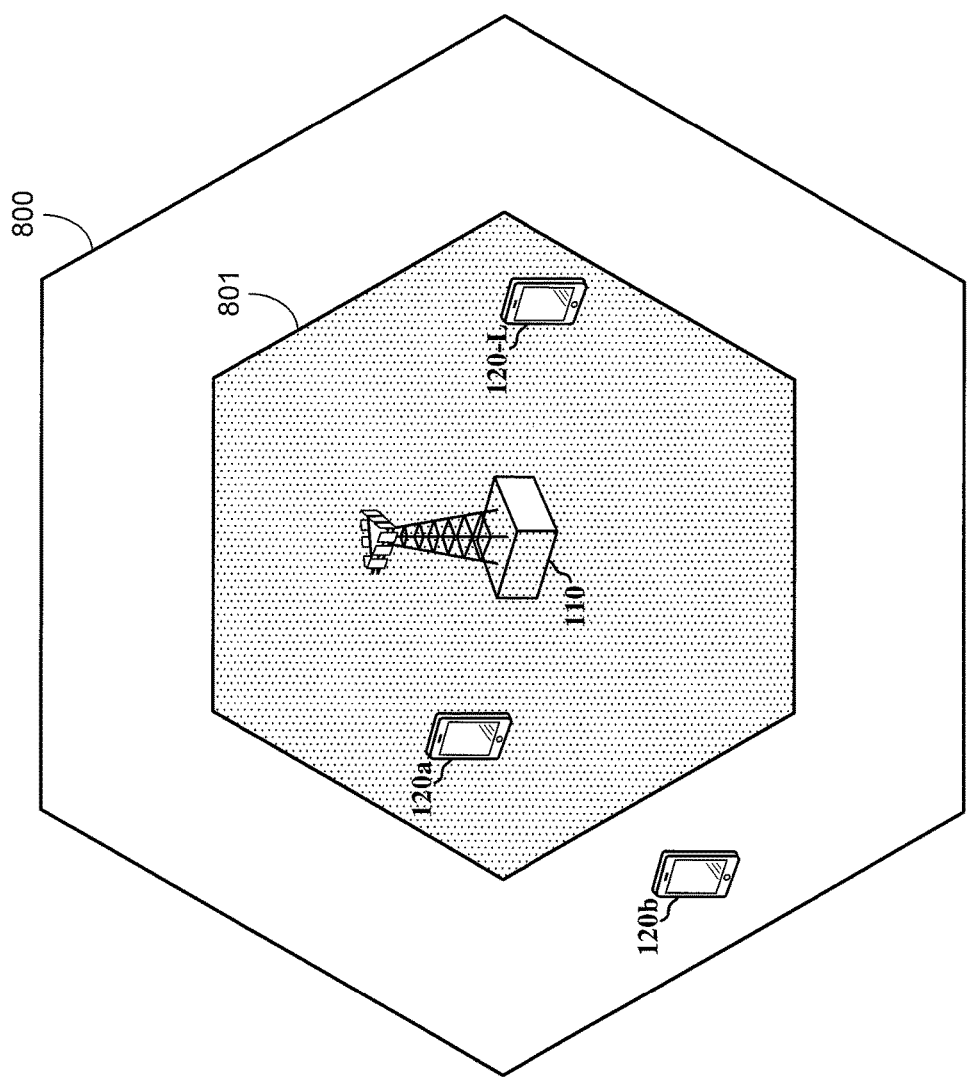
FIG. 8 is a block diagram illustrating a base station and non-legacy UEs configured according to aspects of the present disclosure.

Various aspects of the present disclosure are directed to MBSFN areas using multiple layers. FIG. 8 is a block diagram illustrating base station 110 and non-legacy UEs 120a and 120b configured according to aspects of the present disclosure. FIG. 8 also illustrates a legacy UE 120-L. Base station 110 may include the features, components, and functionality identified and described with respect to base station 110 of FIG. 3. For example, functionality stored as executable logic in memory 344 may, when executed by controller/processor 340 create the execution environment that provides the functionality of base station 110. UEs 120a, 120b, and 120-L may also include the features, components, and functionality identified and described with respect to base station 120 of FIG. 3. For example, functionality stored as executable logic in memory 382 may, when executed by controller/processor 380 create the execution environment that provides the functionality of UE 120. UEs 120a and 120b are more advanced UEs which include more advanced features and processing capabilities than the illustrated legacy UE, UE 120-L. As illustrated, base station 110 may provide eMBMS services and transmissions to mobile devices, such as UEs 120a, 120b, and 120-L. According to various aspects of the present disclosure, the eMBMS services may be provided in multiple layers, such as base layer 800 and enhancement layer 801.

In one aspect of the present disclosure, base layer 800 and enhancement layer 801 are essentially two parts of the same MBSFN area and covered by the same entry in the SIB13 from base station 110. In such MBSFN area enhancement aspects, base layer 800 and enhancement layer 801 use the same MCCH for control information. In order to obtain better coverage for such aspect, the MCCH transmitted from base station 110 is not superposition coded. Instead, base layer 800 and enhancement layer 801 are separated at the physical multicast channel (PMCH) level, which is indicated in the MCCH. Enhancement layer 801 may be scrambled as a function of both MBSFN area ID and enhancement layer indication. Thus, while each layer would share the same MBSFN area ID, the specific enhancement layer indication would be used to differentiate the scrambling of enhancement layer 801 from the scrambling of base layer 800.

Figure 9A:
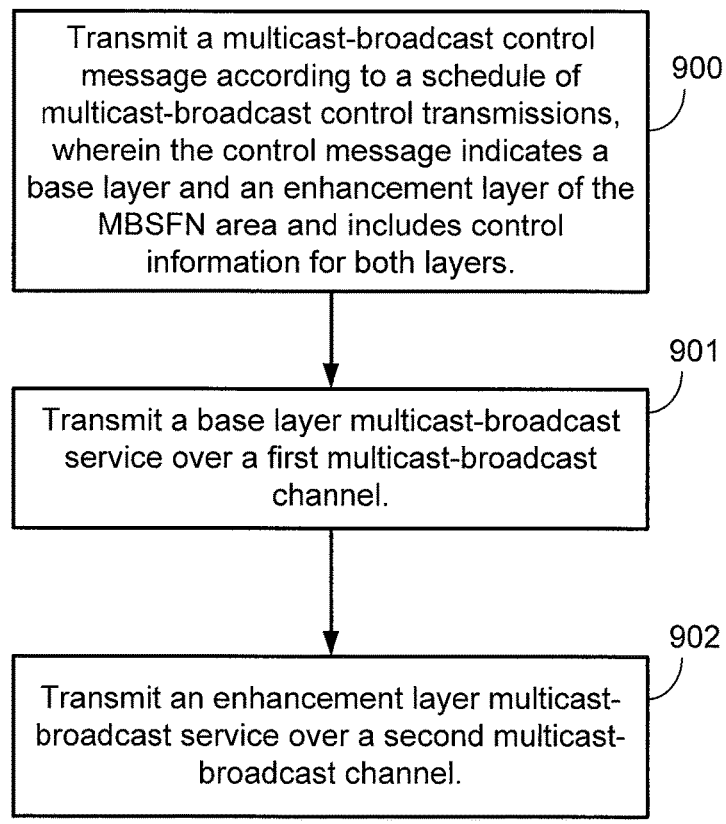
FIG. 9A-11 are block diagrams illustrating example blocks executed to implement aspects of the present disclosure.
Figure 12:
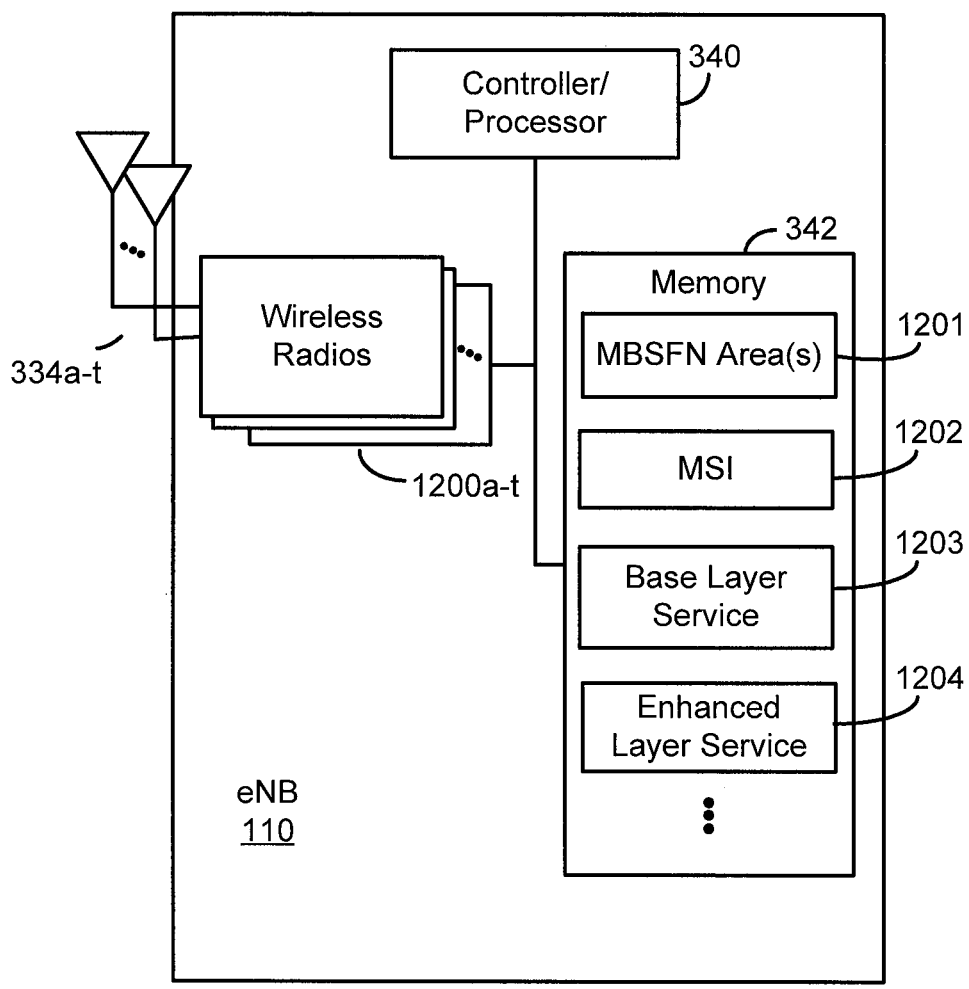
FIG. 12 is a block diagram illustrating a eNB configured according to one aspect of the present disclosure.

FIG. 9A is a block diagram illustrating example blocks executed to implement one aspect of the present disclosure at a base station. The example blocks will also be described with respect to eNB 110, as illustrated in FIG. 12. FIG. 12 is a block diagram illustrating eNB 110 configured according to one aspect of the present disclosure. eNB 110 includes the structure, hardware, and components as illustrated for eNB 110 of FIG. 3. For example, a base station, such as eNB 110, which has components, software, and hardware, as illustrated in FIGS. 3 and 12, includes controller/processor 340, which controls the components and hardware and executes software or logic stored in memory 342 to provide the features and functionality of eNB 110. eNB 110 also includes wireless radios 1200a-t and antennas 334a-t. Wireless radios 1200a-t may include such hardware and components as transmit processor 320, TX MIMO processor 330, modulator/demodulators 332a-t, MIMO detector 336, and receive processor 338.

At block 900, the base station transmits a multicast-broadcast control message according to a schedule of multicast-broadcast control transmissions, which indicates a base layer and an enhancement layer is present within the MBSFN area, and includes control information for each of the base and enhancement layers. For example, a base station, such as eNB 110, under control of controller/processor 340, broadcasts system information stored in memory 342, such as through SIBS (e.g., SIB-13), which may include an indication of the MBSFN serviced within with its coverage area (e.g., MBSFN areas 1201, stored in memory 342), along with multicast-broadcast scheduling information (e.g., MSI 1202, stored in memory 342) for the eMBMS service. eNB 110, under control of controller/processor 340, further broadcasts this system information over its coverage area via wireless radios 1200a-t and antennas 334a-t. eNB 110 transmits an MCCH according to the MSI via the transmission components. The MCCH includes indications that the MBSFN area includes base layer 800 and enhancement layer 801, and includes control information for each of the layers.

At block 901, the base station transmits a base layer multicast-broadcast service at a first multicast-broadcast channel. For example, a base station, such as eNB 110, transmits a base layer service 1203, under control of controller/processor 340, at one location of a PMCH via wireless radios 1200a-t and antennas 334a-t.

At block 902, the base station transmits an enhancement layer multicast-broadcast service over a second multicast-broadcast channel. For example, the base station, such as eNB 110, transmits an enhancement layer service 1204, under control of controller/processor 340, at another location in the PMCH using wireless radios 1200a-t and antennas 334a-t. Thus, while the control information for both base layer 800 and enhancement layer 801 is included in the same MCCH, the service is separated in the PMCH.

Figure 9B:
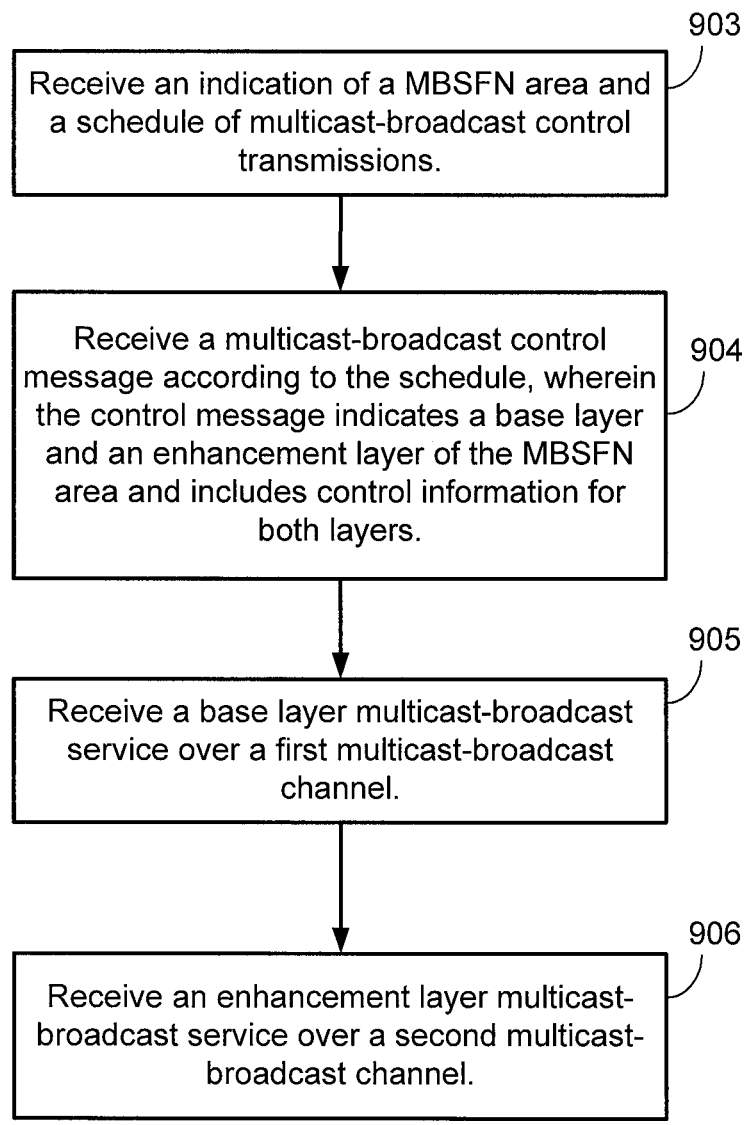
Figure 13:
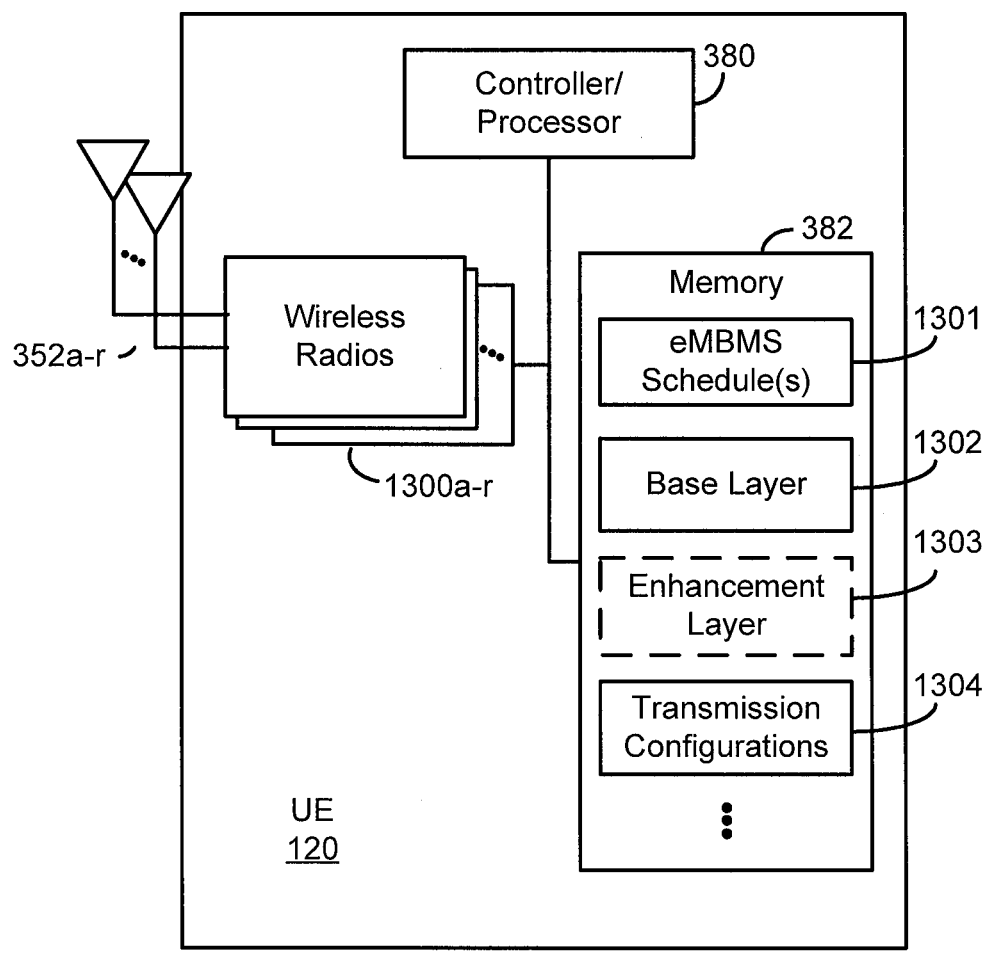
FIG. 13 is a block diagram illustrating a UE configured according to one aspect of the present disclosure.

FIG. 9B is a block diagram illustrating example blocks executed to implement one aspect of the present disclosure at a UE. The example blocks will also be described with respect to UE 120, as illustrated in FIG. 13. FIG. 13 is a block diagram illustrating UE 120 configured according to one aspect of the present disclosure. UE 120 includes the structure, hardware, and components as illustrated for UE 120 of FIG. 3. For example, a UE, such as UE 120, which has components, software, and hardware, as illustrated in FIGS. 3 and 13, includes controller/processor 380, which controls the components and hardware and executes software or logic stored in memory 382 to provide the features and functionality of UE 120. UE 120 also includes wireless radios 1300a-r and antennas 352a-r. Wireless radios 1300a-r may include such hardware and components as transmit processor 364, TX MIMO processor 366, demodulator/modulators 354a-4, MIMO detector 356, and receive processor 358.

At block 903, a UE receives an indication of a MBSFN area and a schedule of multicast-broadcast control transmissions. For example, a UE, such as UE 120, under control of controller/processor 380, receives broadcasts of system information from neighboring base stations, including a serving base station, via wireless radios 1300a-r and antennas 352a-r. Within the broadcast of system information, such as through a SIB, UE 120 receives an indication of the MBSFN area being served and the MSI for the eMBMS scheduling, which is stored at eMBMS scheduling 1301 in memory 382.

At block 904, the UE receives a multicast-broadcast control message according to the schedule, wherein the control message indicates a base layer and an enhancement layer of the MBSFN area and includes control information for both layers. For example, when configured as a non-legacy UE, UE 120, such as non-legacy UEs 120a and 120b, receives an MCCH according to the MSI via wireless radios 1300a-r and antennas 352a-r. The MCCH includes indications that the MBSFN area includes base layer 800 and enhancement layer 801, and includes control information for each of the layers that are stored at base layer control information 1302 and enhancement layer control information 1303. When configured as a legacy UE, UE 120, such as UE 120-L, would only recognize the base layer information and not store enhancement layer control information 1303.

At block 905, the UE receives a base layer multicast-broadcast service over a first multicast-broadcast channel. For example, a UE, such as UEs 120*a*, 120*b*, and 120-L, receives the base layer service at one location of a PMCH using wireless radios 1300*a-r* and antennas 352*a-r*, under control of controller/processor 380 implementing base layer control information 1302, stored in memory 382, for reception of the base layer service.

At block 906, the UE receives an enhancement layer multicast-broadcast service over a second multicast-broadcast channel. For example, when configured as a non-legacy UE, UE 120, such as non-legacy UEs 120*a* and 120*b*, receives the enhancement layer service at another location in the PMCH using wireless radios 1300*a-r* and antennas 352*a-r*, under control of controller/processor 380 implementing enhancement layer control information 1303 stored in memory 382, for reception of the enhancement layer service. Thus, as noted above, while the control information for both base layer 800 and enhancement layer 801 is included in the same MCCH, the service is separated in the PMCH.

Additional aspects of the present disclosure may be configured for backward compatible operations with legacy UEs, such as UE 120-L (FIG. 8) for the described MBSFN area enhancements. In such backward compatible aspects, the MCCH and MSI may be designed such that legacy UE 120-L can understand the MBSFN parts of base layer 800 and ignore the parts related to enhancement layer 801. For example, in a first option, a new media access control (MAC) control element (CE) may be defined with a reserved logical channel identifier (LCID) that indicates enhancement layer 801 MSI. Thus, the MSI for enhancement layer 801 may be transmitted by base station 110 along with the MSI for base layer 800 in the same MAC protocol data unit (PDU) in a transmission via base layer 800. Compatible UEs, such as non-legacy UEs 120*a* and 120*b*, may then be able to distinguish the MSI of enhancement layer 801 by reading the LCID, while the legacy UEs, such as legacy UE 120-L, ignore the LCID and the associated MSI of enhancement layer 801 under control of controller/processor 380.

In a second option for backward compatible MBSFN area enhancements, which may also be illustrated in FIG. 8, the MSI of enhancement layer 801 may be transmitted via the transmission components by base station 110 on enhancement layer 801 in a separate MAC CE that only compatible UEs, such as non-legacy UEs 120*a* and 120*b*, attempt to decode. Thus, legacy UEs, such as legacy UE 120-L, will neither attempt to decode this separate MAC CE nor obtain the additional MSI of enhancement layer 801.

A third option for backward compatible MBSFN area enhancements, which may also be illustrated in FIG. 8, provides a special temporary multicast group identifier (TMGI) that may be reserved in base layer 800. The TMGI is used by the UE, such as UEs 120*a*, 120*b*, and 120-L, under control of controller/processor 380 to determine whether MBMS services related to that TMGI are active in the given MBSFN area. TMGI values are allocated to MBMS bearers and provided to the UEs via application layer signaling as indicated to the UE via the MCCH. Thus, the reserved TMGI for enhancement layer 801 control information are indicated to the UEs, such as UE 120*a*, 120*b*, and 120-L, in base layer 800. This third option, therefore, uses the MTCH of base layer 800, identified to the compatible UE, such as non-legacy UEs 120*a* and 120*b*, by the reserved TMGI, to convey enhancement layer 801 control information, including MCCH and MSI. This assumes that the MSP of base layer 800 is no longer than the MSP of enhancement layer 801. Thus, the third option uses a traffic channel of base layer 800 to send control information for enhancement layer 801.

Additional aspects of the present disclosure directed to MBSFN area enhancements may alternatively be configured with non-backward compatible MSI designs. In such non-backward compatible designs, the MSI for base layer 800 and enhancement layer 801 can be included in the same MAC CE. The compatible UEs, such as UEs 120*a* and 120*b*, would be able to read both MSI in order to access either or both of base layer 800 and enhancement layer 801.

Various additional aspects of the present disclosure are directed to nested MBSFN area designs. In the nested MBSFN area aspects, the nested MBSFN areas may, in implementation, target particular locations or venues in a venue-cast type of use. The nested MBSFN area design may also be illustrated by FIG. 8. Accordingly, the content of enhancement layer 801 may be different from different eNBs or base stations. The different content of enhancement layer 801 may be facilitated with different MBSFN areas for enhancement layer 801 identified within the SIB-13 information from base station 110. A separate MCCH may be used to transmit the control information for such nested enhancement layers, such as enhancement layer 801.

Figure 10:
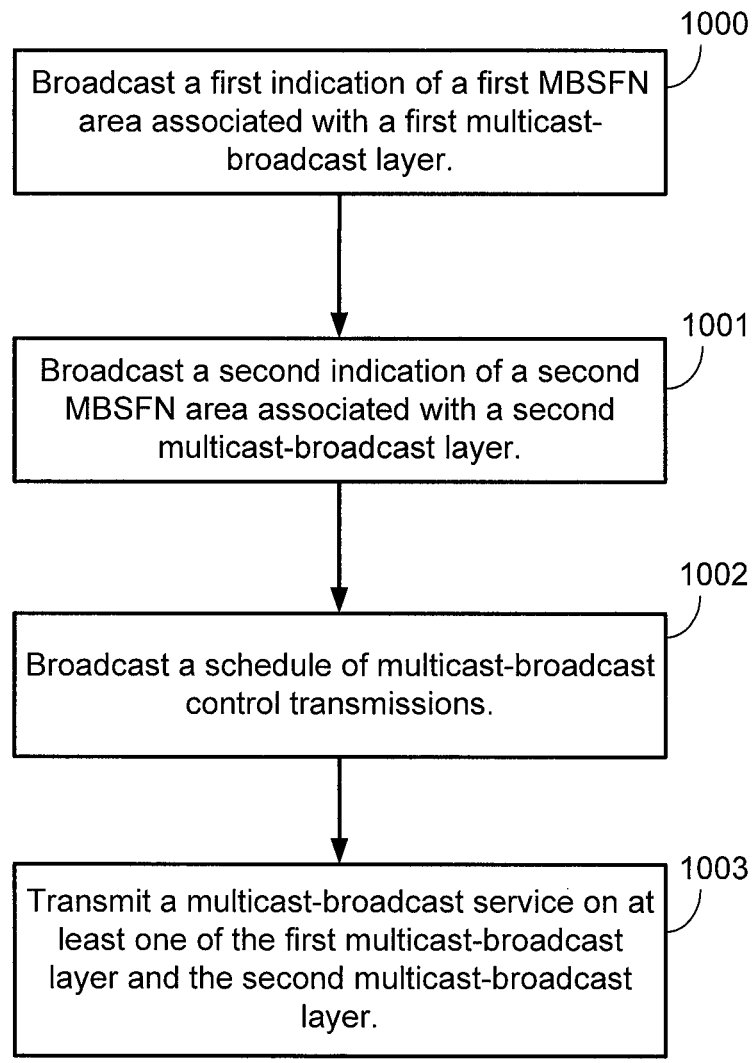

FIG. 10 is a block diagram illustrating example blocks executed to implement one aspect of the present disclosure. At block 1000, a base station broadcasts a first indication of a first MBSFN area associated with a first multicast-broadcast layer. For example, a base station, such as eNB 110, may broadcast system information that includes identification of MBSFN areas 1201 serviced within its coverage area, as stored in storage 342. Such system broadcast information may be broadcast in SIB messages, such as SIB-13, using wireless radios 1200*a-t* and antennas 334*a-t*.

At block 1001, the base station broadcasts a second indication of a second MBSFN area associated with a second multicast-broadcast layer. For example, the base station, such as eNB 110, in the described aspect, provides two different MBSFN areas stored in MBSFN areas 1201, one for the first layer, which may be base layer 800 or enhancement layer 801, and the other MBSFN area is provided for the second layer, which may be the other of base layer 800 or enhancement layer 801. This system information would be broadcast from base station 110 using wireless radios 1200*a-t* and antennas 334*a-t* along with the other information in the broadcast message.

At block 1002, the base station broadcasts a schedule of multicast-broadcast control transmissions. For example, the base station, such as eNB 110, transmits an MCCH, via wireless radios 1200*a-t* and antennas 334*a-t*, according to the MCE scheduling and transmits MSI 1202 according to the amount of data over base layer 800 is received via a synchronization protocol.

At block 1003, the base station transmits a multicast-broadcast service on at least one of the first multicast-broadcast layer or the second multicast-broadcast layer. For example, the base station, such as eNB 110, may broadcast eMBMS services using wireless radios 1200*a-t* and antennas 334*a-t* on either or both of base layer 800, for base layer service 1203, and enhancement layer 801, for enhancement layer 1204.

Implementation of the aspects providing nested MBSFN areas may depend on where the MCCH for enhancement layer 801 can be transmitted. Three potential options for transmitting MCCH for enhancement layer 801 in the nested MBSFN areas include transmitting the MCCH for enhancement layer 801 without superposition coding, transmitting potentially with superposition coding with the MCCH for base layer 800, or transmitting potentially with superposition coding with either the MCCH or multicast traffic channel (MTCH) of base layer 800. Each such option may be included in backward compatible designs.

It should be noted that non-backward compatible designs for nested MBSFN areas may also be implemented in additional aspects to allow MCS/TPR of base layer 800 to be conditioned on the existence of enhancement layer 801 in each subframe. Thus, non-legacy UEs, such as UEs 120*a* and 120*b*, would monitor MCCH/MSI for enhancement layer 801 as well as monitoring base layer 800.

In the first option of MCCH transmission for nested MBSFN area enhancements, the MCCH for enhancement layer 801 is not superposition coded. Thus, no changes would be needed for current SIB-13 MBMS information. In such aspects, the network ensures that the MCCH for enhancement layer 801 does not collide with MCCH/MSI for base layer 800, and when the MCCH for enhancement layer 801 is scheduled to collide with the MTCH for base layer 800, the transmitting eNB, such as base station 110, may mute the MTCH transmission for base layer 800. For purposes of the legacy UE, such as UE 120-L, when the MTCH for base layer 800 is muted, the legacy UE will treat the muted MTCH as a decoding failure. The content of the MCCH for enhancement layer 801 indicates that it is an enhancement layer MBSFN nested within the associated base layer MBSFN area(s).

In the second option for transmitting MCCH for enhancement layer 801 for nested MBSFN area designs, the MCCH for enhancement layer 801 is potentially superposition coded with the MCCH for base layer 800. In this second option, the network indicates signaling of MCS and TPR for the MCCH for enhancement layer 801 when it is superposition coded, which may depend on the signaling MCS for the base layer 800. The second option would also indicate signaling MCS and TPR for MCCH when it is not superposition coded, in which case, the MCS/TPR would not be dependent on the MCS of base layer 800. This indication of MCS/TPR signaling may be included, under control of controller/processor 340, in SIB messages or in dedicated RRC messages from base station 110 transmitted using the transmission components when the UE sets up the MBSFN.

A UE, such as non-legacy UEs 120*a* and 120*b*, would determine, under control of controller/processor 380, whether the MCCH for enhancement layer 801 is superposition coded or not based on the whether the MCCH for enhancement layer 801 is scheduled with another MCCH for base layer 800 on the same subframe in the SIB. The UE would obtain signaling MCS on base layer 800 from SIB13 for decoding the superposition coded MCCH for enhancement layer 801.

It should be noted that the content of the MCCH for enhancement layer 801 indicates the list of associated MBSFN area(s) of base layer 800 or other base layers, and if there are more than one base layer MBSFN areas that this enhancement layer MBSFN can be superposition coded with. Thus, the UE would monitor the MCCH for each of them.

In the third option for transmitting enhancement layer MCCH for nested MBSFN area designs, the MCCH for enhancement layer 801 is potentially superposition coded with the MCCH or MTCH of base layer 800. In such option, the network would indicate the associated MBSFN area(s) of base layer 800 and signaling MCS and TPR as function of either the presence of base layer 800 or the MCS of base layer 800. The indication could be listed in SIB messages or in dedicated RRC messages when the UE sets up the MBSFN.

The UE, such as UEs 120*a* and 120*b*, would read the MCCH and MSI of the associated base layer(s), such as base layer 800, to determine whether the MCCH for enhancement layer 801 is superposition coded, based on the whether it is scheduled with another MCCH/MSI or MTCH of base layer 800 on the same subframe. The UE, such as non-legacy UEs 120*a* and 120*b*, obtains signaling MCS on base layer 800 from SIB13 for decoding the MCCH for enhancement layer 801 when it is superposition coded with MCCH/MSI of base layer 800. The UE obtains data MCS on base layer 800 from the MCCH of base layer 800 for decoding the MCCH for enhancement layer 801 when it is superposition coded with a MTCH of base layer 800.

Figure 11:
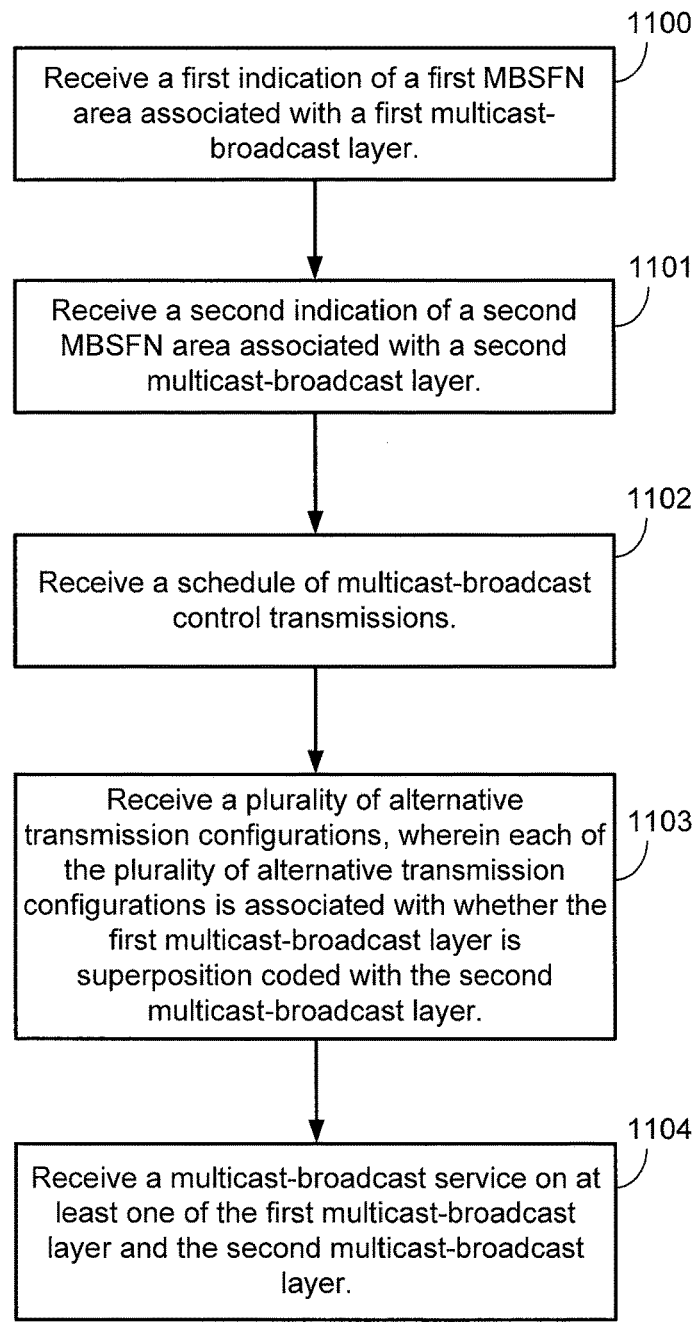

FIG. 11 is a block diagram illustrating example blocks executed to implement one aspect of the present disclosure. At block 1100, a UE receives a first indication of a first MBSFN area associated with a first multicast-broadcast layer. For example, a UE, such as UE 120, under control of controller/processor 380, receives broadcasts of system information from neighboring base stations, including a serving base station via antennas 352*a-r* and wireless radios 1300*a-r*. The system information would include an indication that base station 110 provides eMBMS service for a first MBSFN area within its coverage area.

At block 1101, the UE receives a second indication of a second MBSFN area associated with a second multicast-broadcast layer. For example, UE 120 when configured as a non-legacy UE, such as non-legacy UEs 120*a* and 120*b*, according to various aspects of the present disclosure, receives system broadcast information via wireless radios 1300*a-r* and antennas 352*a-r* that base station 110 provides access to multiple MBSFN layers within the coverage area.

At block 1102, the UE receives a schedule of multicast-broadcast control transmissions. For example, UE 120 receives, via wireless radios 1300*a-r* and antennas 352*a-r*, as a part of the system broadcast information eMBMS scheduling information, such as an MSI, which identifies the schedule of MCCH within the MSP. UE 120 would store the scheduling information at eMBMS schedules 1301 in memory 382.

At block 1103, the UE receives a plurality of alternative transmission configurations, wherein each of the plurality of alternative transmission configurations is associated with whether the first multicast-broadcast layer is superposition coded with the second multicast-broadcast layer. For example, UE 120, such as non-legacy UEs 120*a* and 120*b*, may further receive, either as a part of system broadcast information, such as through a SIB, or via a dedicated RRC message upon setup of the MBSFN area, a number of alternative transmission configurations via wireless radios 1300*a-r* and antennas 352*a-r*, such as MCS, TPR, and the like, and are stored at transmission configurations 1304 in memory 382. Each of these alternative MCS/TPR correspond to whether one of the layers is present or not (e.g., whether base layer 800 or enhancement layer 801 is present), and, if present, what MCS value has been assigned to that layer. UE 120, under control of controller/processor 380, may select one of these alternative MCS/TPR configurations, from transmission configurations 1304, in response to determining whether one or both of base layer 80 or enhancement layer 801 is present, and, if so, which MCS was assigned to the other layer.

At block 1104, the UE then receives a multicast-broadcast service on at least one of the first multicast-broadcast layer and the second multicast-broadcast layer. For example, UE 120, such as non-legacy UEs 120*a* and 120*b*, may receive the broadcast of eMBMS services using wireless radios 1300*a-r* and antennas 352*a-r* on either or both of base layer 800, using base layer control information 1302, and enhancement layer 801, using enhancement layer control information 1303.

With the various options for transmitting the MCCH for enhancement layer 801 in nested MBSFN area design enhancements, the first option of transmitting without superposition coding would generally have a good coverage for MCCH for enhancement layer 801 compared to the other superposition coding options. The first and second options, either no superposition coding or potentially superposition coding the MCCH for enhancement layer 801 with the MCCH for base layer 800 may allow the non-legacy UE, such as non-legacy UEs 120*a* and 120*b*, to acquire the MCCH for enhancement layer 801 without reading any MCCH/MSI of base layer 800, which may lead to faster acquisition time compared to the third option, in which the MCCH for enhancement layer 801 may be superposition coded with either the MCCH or MTCH of base layer 800. Based on MCCH and MSI of both base layer 800 and enhancement layer 801, the non-legacy UEs may determine whether base layer 800 is present or not, the corresponding data MCS and TPR for demodulation, and whether to rate match the base layer RS or simply use the base layer subframe structure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting a multicast-broadcast control message according to a schedule of multicast-broadcast control transmissions in a multicast-broadcast transmission scheduling period, wherein the multicast-broadcast control message indicates a base layer and an enhancement layer being part of a same multicast-broadcast single frequency network (MBSFN) area, wherein the multicast-broadcast control message is a single multicast-broadcast control message that transmitted via a single multicast control channel (MCCH) that is shared by the base layer and the enhancement layer, and wherein base control information for the base layer and enhanced control information for the enhanced layer are included in the shared, single multicast-broadcast control message;

transmitting a base layer multicast-broadcast service over a first multicast-broadcast channel; and transmitting an enhancement layer multicast-broadcast service over a second multicast-broadcast channel.

2. The method of claim 1, further including:
scrambling the enhancement layer multicast-broadcast service using an identifier (ID) of the MBSFN area and an indicator indicating the enhancement layer.

3. The method of claim 1, further including:
signaling a plurality of alternative transmission configurations, wherein each of the plurality of alternative transmission configurations is associated with whether the base layer multicast-broadcast service and the enhancement layer multicast-broadcast service are transmitted over the base layer and the enhancement layer at a same time.

4. The method of claim 1, further including:
transmitting multicast-broadcast scheduling information for the base layer and the enhancement layer in a same media access control (MAC) control element (CE).

5. The method of claim 1, further including:
transmitting enhancement layer multicast-broadcast scheduling information in a media access control (MAC) control element (CE) with a reserved logical channel identifier (LCID) associated with the enhancement layer.

6. The method of claim 5, further including:
transmitting base layer multicast-broadcast scheduling information and the enhancement layer multicast-broadcast scheduling information in a same MAC protocol data unit (PDU).

7. The method of claim 1, further including:
transmitting enhancement layer multicast-broadcast scheduling information in a media access control (MAC) control element (CE) on the enhancement layer.

8. The method of claim 1, further including:
transmitting enhancement layer multicast-broadcast scheduling information in a base layer multicast traffic channel wherein the base layer multicast traffic channel includes a multicast group identifier identifying the enhancement layer multicast traffic channel and the enhancement layer multicast-broadcast scheduling information.

9. An apparatus configured for wireless communication, the apparatus comprising:
at least one processor; and
a memory coupled to the at least one processor, wherein the at least one processor is configured:
    to transmit a multicast-broadcast control message according to a schedule of multicast-broadcast control transmissions in a multicast-broadcast transmission period, wherein the multicast-broadcast control message indicates a base layer and an enhancement layer being part of a same multicast-broadcast single frequency network (MBSFN) area, wherein the multicast-broadcast control message is a single multicast-broadcast control message that is transmitted via a single multicast control channel (MCCH) that is shared by the base layer and the enhancement layer, and wherein base control information for the base layer and enhanced control information for the enhanced layer are included in the shared, single multicast-broadcast control message;
    to transmit a base layer multicast-broadcast service over a first multicast-broadcast channel; and
    to transmit an enhancement layer multicast-broadcast service over a second multicast-broadcast channel.

10. The apparatus of claim 9, further including configuration of the at least one processor to scramble the enhancement layer multicast-broadcast service using an identifier (ID) of the MBSFN area and an indicator indicating the enhancement layer.

11. The apparatus of claim 9, further including configuration of the at least one processor to signal a plurality of alternative transmission configurations, wherein each of the plurality of alternative transmission configurations is associated with whether the base layer multicast-broadcast service and the enhancement layer multicast-broadcast service are transmitted over the base layer and the enhancement layer at a same time.

12. The apparatus of claim 9, further including configuration of the at least one processor to transmit multicast-broadcast scheduling information for the base layer and the enhancement layer in a same media access control (MAC) control element (CE).

13. The apparatus of claim 9, further including configuration of the at least one processor:
    to transmit enhancement layer multicast-broadcast scheduling information in a media access control (MAC) control element (CE) with a reserved logical channel identifier (LCID) associated with the enhancement layer; and
    to transmit base layer multicast-broadcast scheduling information and the enhancement layer multicast-broadcast scheduling information in a same MAC protocol data unit (PDU).

14. The apparatus of claim 9, further including configuration of the at least one processor to transmit enhancement layer multicast-broadcast scheduling information in a media access control (MAC) control element (CE) on the enhancement layer.

15. The apparatus of claim 9, further including configuration of the at least one processor to transmit enhancement layer multicast-broadcast scheduling information in a base layer multicast traffic channel wherein the base layer multicast traffic channel includes a multicast group identifier identifying the enhancement layer multicast traffic channel and the enhancement layer multicast-broadcast scheduling information.

* * * * *